(12) United States Patent  
Wyffels

(10) Patent No.: US 10,449,956 B2
(45) Date of Patent: Oct. 22, 2019

(54) OBJECT TRACKING BY UNSUPERVISED LEARNING

(71) Applicant: Ford Global Technologies, LLC, Dearborn, MI (US)

(72) Inventor: Kevin Wyffels, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 15/408,862

(22) Filed: Jan. 18, 2017

(65) Prior Publication Data

US 2018/0203446 A1 Jul. 19, 2018

(51) Int. Cl.
| | | |
|---|---|---|
| *B60W 30/09* | (2012.01) | |
| *G01S 7/48* | (2006.01) | |
| *G01S 17/66* | (2006.01) | |
| *G01S 17/42* | (2006.01) | |
| *G05D 1/02* | (2006.01) | |
| *G01S 17/93* | (2006.01) | |

(52) U.S. Cl.
CPC ........... *B60W 30/09* (2013.01); *G01S 7/4808* (2013.01); *G01S 17/42* (2013.01); *G01S 17/66* (2013.01); *G01S 17/936* (2013.01); *G05D 1/024* (2013.01); *B60W 2420/52* (2013.01)

(58) Field of Classification Search
None
See application file for complete search history.

(56) References Cited

U.S. PATENT DOCUMENTS

| | | | |
|---|---|---|---|
| 8,112,225 B2 | 2/2012 | Eidehall et al. | |
| 8,217,938 B2 | 7/2012 | Chen et al. | |
| 8,270,732 B2 | 9/2012 | Cobb et al. | |
| 8,655,513 B2 | 2/2014 | Vanek | |
| 8,670,604 B2 | 3/2014 | Eggert et al. | |
| 8,736,463 B1 | 5/2014 | Zhu et al. | |
| 8,818,702 B2 | 8/2014 | Zeng et al. | |
| 8,923,606 B2 | 12/2014 | Wu et al. | |
| 8,953,888 B2 * | 2/2015 | Kohli | G06K 9/6211 |
| | | | 382/190 |
| 9,076,219 B2 | 7/2015 | Cha et al. | |
| 9,129,211 B2 | 9/2015 | Zeng | |

(Continued)

FOREIGN PATENT DOCUMENTS

| | | |
|---|---|---|
| KR | 1020160048530 A | 5/2016 |
| WO | WO 2012129484 A1 | 9/2012 |
| WO | WO 2016170330 A1 | 10/2016 |

OTHER PUBLICATIONS

Petrovskaya et al., "Model Based Vehicle Detection and Tracking for Autonomous Urban Driving", Autonomous Robots (2009) 26: 123-139 (official version online at www.springerlink.com), 17 pages.

(Continued)

*Primary Examiner* — Lail A Kleinman
(74) *Attorney, Agent, or Firm* — Frank A. MacKenzie; Bejin Bieneman PLC

(57) ABSTRACT

A computing device in a vehicle can determine one or more objects based on 3D data points by determining a joint Bayesian probability of each of the one or more objects, conditioned on previously determined objects, and pilot the vehicle based on the determined one or more objects, wherein the objects have parameters including locations, sizes, poses, speeds, directions and predicted paths.

20 Claims, 7 Drawing Sheets

(56) References Cited

U.S. PATENT DOCUMENTS

| | | |
|---|---|---|
| 9,305,244 B2 | 4/2016 | Mathews et al. |
| 9,905,032 B2 | 2/2018 | Rogan et al. |
| 9,945,950 B2 | 4/2018 | Newman et al. |
| 2009/0119010 A1 | 5/2009 | Moravec |
| 2009/0312985 A1 | 12/2009 | Eliazar |
| 2010/0164951 A1 | 7/2010 | Stewart |
| 2011/0129119 A1 | 6/2011 | Eggert et al. |
| 2012/0116662 A1* | 5/2012 | Zeng ............... G05D 1/024 701/300 |
| 2013/0246020 A1* | 9/2013 | Zeng ............... G06N 7/005 703/2 |
| 2015/0154328 A1 | 6/2015 | Michalke et al. |
| 2015/0310601 A1* | 10/2015 | Rodriguez ......... G06T 1/0007 348/150 |

OTHER PUBLICATIONS

GB Search Report dated Jul. 17, 2018 re GB Appl. No. 1800750.0.
Non-Final Office Action dated Jun. 11, 2018 for U.S. Appl. No. 15/408,877 (26 pages).

\* cited by examiner

OBJECT TRACKING BY UNSUPERVISED LEARNING

BACKGROUND

Vehicles can be equipped to operate in both autonomous and occupant piloted mode. Vehicles can be equipped with computing devices, networks, sensors and controllers to pilot the vehicle and to assist an occupant in piloting the vehicle. Sensors can include LIDAR sensors that produce 3D data points that represent the locations of objects in a region surrounding the vehicle.

DETAILED DESCRIPTION

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
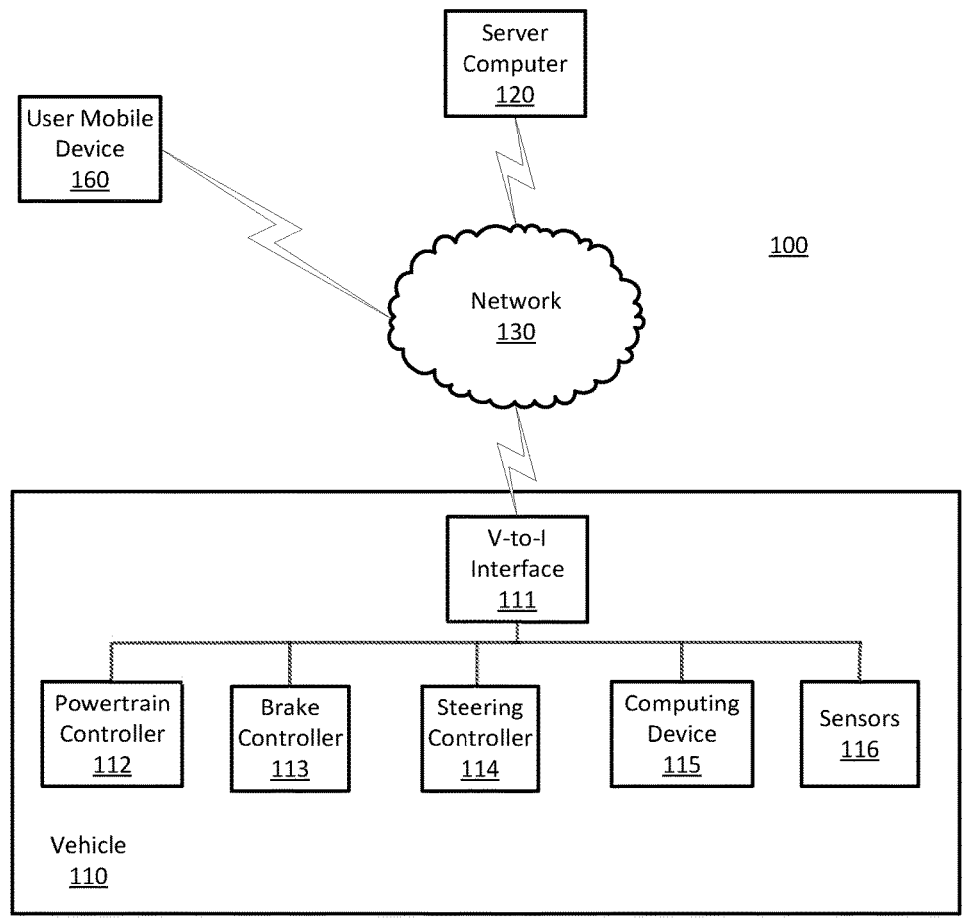
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
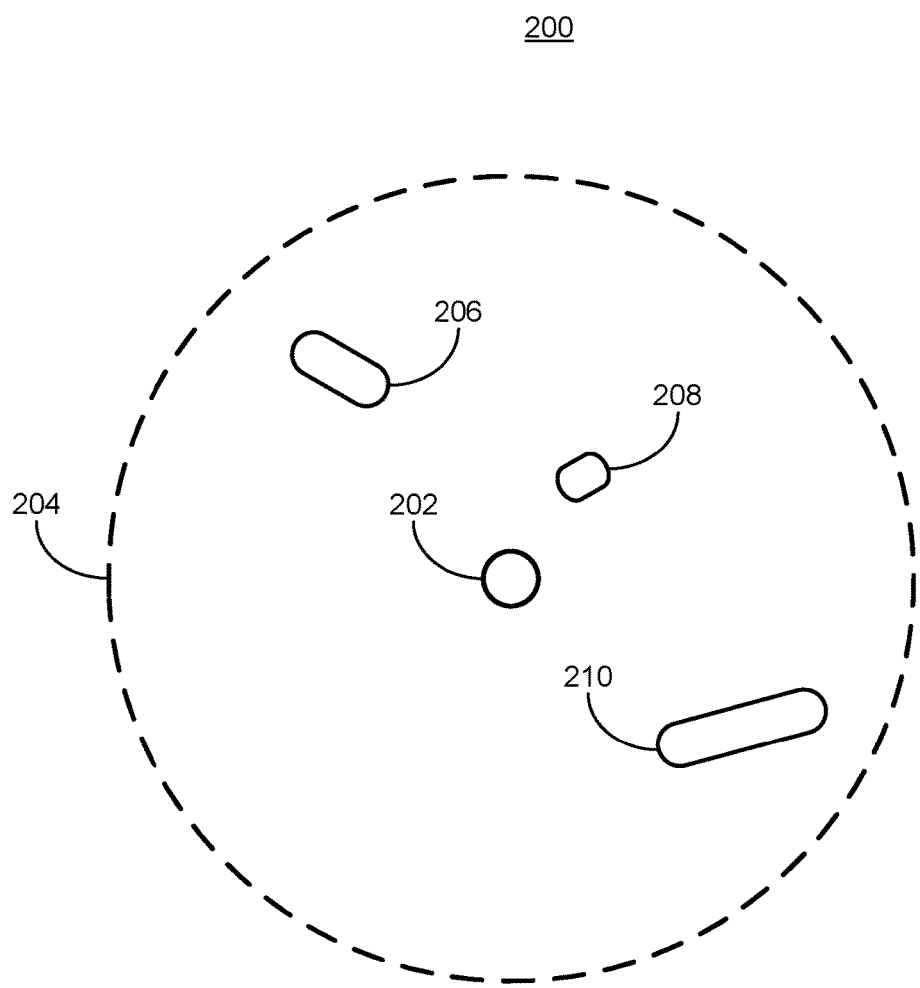
FIG. 2 is a diagram of an example LIDAR sensor and objects.

FIG. 2 is a diagram of a traffic scene 200 including a LIDAR sensor 202. LIDAR sensor 202 has a field of view 204 that includes all locations within the range at which LIDAR sensor 202 can detect 3D points. As discussed above in relation to FIG. 1, LIDAR sensor 202 detects 3D points within the field of view 204 by radiating pulses of laser energy from LIDAR sensor 202 in planes parallel or near parallel to the roadway and processing reflected laser energy to determine 3D points as the range or distance to the 3D point from the LIDAR sensor 202, thereby sampling the field of view 204 radially from LIDAR sensor 202 in a plane, parallel to the drivable surface of the roadway, to the limits (dashed line) of the field of view 204.

LIDAR sensor 202 can be included in a vehicle 110 located on a roadway that includes traffic objects 206, 208, 210 on or near the roadway. Vehicle 110 can be stationary ("parked") or moving and the traffic objects 206, 208, 210 can either be stationary or moving. Traffic objects can include other vehicles, pedestrians, road signs, barriers, barrels, debris, or any other rigid or semi-rigid three-dimensional solid that can occupy space and reflect LIDAR sensor 202 signals. Traffic objects 206, 208, 210 can be at locations on or near a roadway.

Traffic objects 206, 208, 210 can be on or near the roadway upon which vehicle 110 is being piloted by computing device 115. The computing device 115 can locate and track traffic objects 206, 208, 210 in the field of view 204 to assist in piloting vehicle 110. For example, in traffic scene 200, LIDAR sensor 202 can be included in a vehicle 110, traffic object 206 can represent a second vehicle 110, traffic object 208 can represent a pedestrian and traffic object 210 can represent a large vehicle 110 ("truck").

Computing device 115 can associate 3D data points with traffic objects 206, 208, 210 by first scanning field of view 204 with LIDAR sensor 202 in the absence of traffic objects 206, 208, 210 and storing the resulting 3D data points in non-volatile storage in computing device 115. The stored 3D data points can be subtracted from subsequent scans to yield differences, which are 3D data points associated with traffic objects 206, 208, 210. Subtracting stored 3D data points from subsequently acquired 3D data points is a known technique that can be referred to as "background subtraction," for example. As disclosed herein, background subtraction of 3D data points that do not equal 3D data points acquired previously at that radial angle from LIDAR sensor 202 adjusted for ordinary variation, advantageously can be associated with a traffic object 206, 208, 210 using techniques discussed below with respect to FIGS. 6 and 7.

Locating traffic objects 206, 208, 210 includes determining the locations, sizes and poses of enclosing rectangles that include 3D data points associated with the traffic objects 206, 208, 210, where the location, size and pose of the enclosing rectangles can be defined by two pairs of parallel lines arranged orthogonally in a plane parallel to the drivable surface of the roadway. Locations in the plane parallel to the drivable surface of the roadway can be based on an X, Y coordinate system relative to a predetermined origin, which can, for example, be associated with vehicle 110. The location of the enclosing rectangle can be determined by the X, Y coordinates of the points of intersection of the pairs of orthogonal parallel lines which form the vertices of the rectangle, for example. The size (area) of the rectangle is determined by the product of distance each pair of parallel lines is apart and the pose is defined as the angle of the pair of orthogonal parallel lines with respect to the X, Y axes. Determining size, location and pose of rectangles that include 3D points associated with traffic objects 206, 208, 210 is the subject of co-pending U.S. patent application Ser. No. 15/408,877, entitled OBJECT TRACKING BY UNSUPERVISED LEARNING, by the current inventor and assigned to the same assignee, which application is fully incorporated herein by reference in its entirety.

Once the location, size and pose of a rectangle enclosing each of the traffic objects 206, 208, 210 is determined, computing device 115 can use this information to track traffic objects 206, 208, 210 by determining enclosing rectangles for each traffic object 206, 208, 210 at one or more successive time steps and determining a trajectory for each traffic object 206, 208, 210. Determining trajectories for the traffic objects 206, 208, 210 includes determining speed, direction and a predicted path for each traffic object 206, 208, 210. Determining speed, direction and a predicted path for the traffic objects 206, 208, 210 permits computing device 115 to predict future locations for traffic objects 206, 208, 210. Predicting the future locations of traffic objects 206, 208, 210 permits computing device to pilot vehicle 110 to a predetermined location while safely avoiding traffic objects 206, 208, 210, for example.

Tracking enclosing rectangles associated with traffic objects 206, 208, 210 is a data association problem in multi-object tracking that includes estimating the source of the 3D data points/sensor observations. Each 3D data point is classified as either object or background and object 3D data points can be associated with an enclosing rectangle as discussed above. Each 3D data point can be classified as belonging to one of the following classes:

TABLE 1

3D data point classes

1. An observation of an existing tracked object.
2. An observation of a previously untracked object.
3. False alarm or clutter.

Object 3D data points can be associated with traffic objects 206, 208, 210 by first heuristically clustering the raw data into disjoint sets where all the object 3D data points within an individual cluster are assumed to belong to the same traffic object 206, 208, 210, e.g., one cluster of object 3D data points per traffic object 206, 208, 210. Following this step, known solutions exist for general optimal one-to-one assignment problems (e.g., Hungarian Algorithm) to perform the association for each observed cluster. Errors in either of these steps can result in catastrophic divergence of the algorithm, leading to failure in tracking. Failure in tracking can prevent computing device 115 from predicting future locations of traffic objects 206, 208, 210 and thereby prevent computing device 115 from predicting a safe path for piloting first vehicle 110.

Heuristic clustering algorithms for clustering object 3D data points can fail in complex, real-world traffic scenes for at least two reasons: First, inter-object occlusion casts shadows in the LIDAR sensor 202 data, which result in objects being only partially observed which leads to "over-segmentation", where multiple clusters are associated with multiple objects rather than associated with one object. This violates the fundamental assumption that each traffic object 206, 208, 210 is associated with a single cluster of object 3D data points. The second way in which heuristic clustering algorithms for clustering object 3D data points can fail is that traffic objects 206, 208, 210 moving in close proximity (e.g. a traffic jam, crowd of pedestrians) can result in "under-segmentation", where object 3D data points from multiple objects are clustered into a single cluster. In either case, incorrectly determining the number of traffic objects 206, 208, 210 at successive time steps can cause computing device 115 to fail to track traffic objects 206, 208, 210.

From a machine learning perspective, an object can be considered to be an "expert" at classifying 3D data points associated with itself and very poor at classifying object 3D data points associated with other objects. This can be mathematically modeled as a weighted combination of each object's individual classifications, referred to as a mixture of experts or mixture model. Techniques well-known in the pattern recognition and machine learning literature can be used to perform mixture of experts model-fitting. In some techniques, a set of model parameters can be predetermined that best classify the 3D data points, where the model parameters are defined as the number of experts (objects) and their individual attributes, for example the number of objects in the field of view, and their respective locations, sizes, poses, velocities and predicted paths.

Since computing device 115 is tracking 3D objects in the real world, the relationship between the experts (objects) at successive time steps must obey the laws of classical physics. Specifically, the number of experts (objects) can only change between time steps if objects enter or leave the LIDAR sensor field of view or enter or leave an occlusion shadow. Further, for each expert (object) at a previous time step (k−1) that does not exit the field of view or enter an occlusion shadow, there must exist a corresponding expert (object) at time step k, with predictable attributes. In this way, a mixture of experts model at a time step k can be predicted from a mixture of experts model determined at a previous time step (k−1) with a predictable degree of accuracy.

Figure 3:
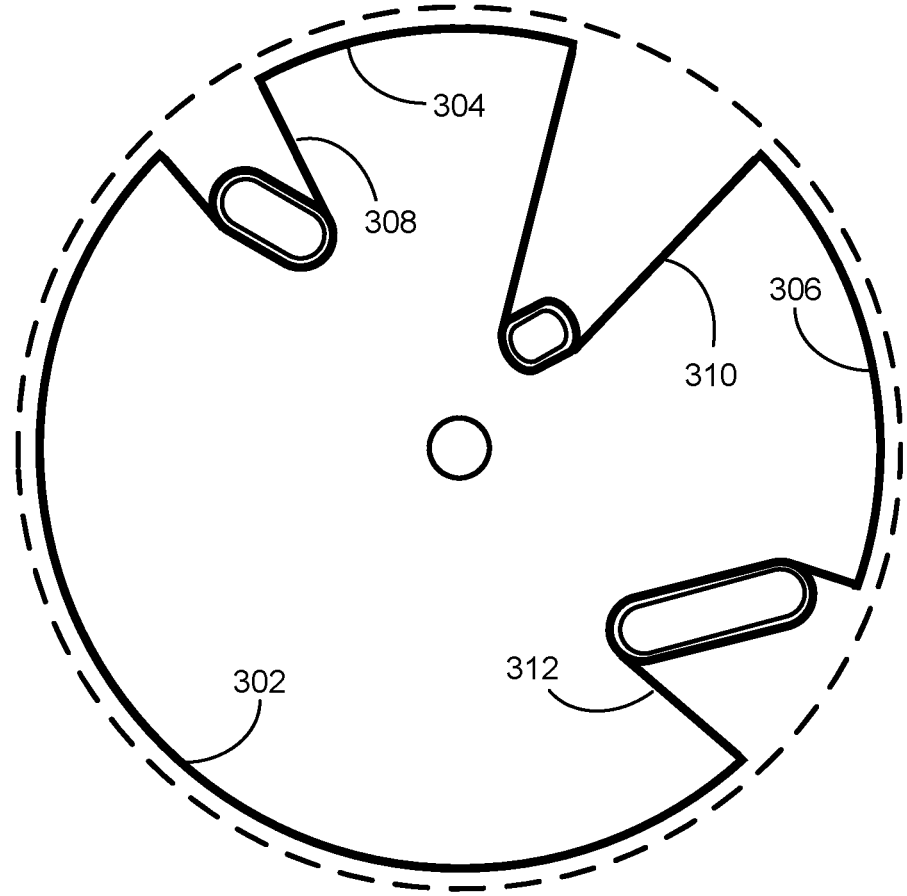
FIG. 3 is a diagram of an example LIDAR sensor and objects.

FIG. 3 is a diagram of a traffic scene 200 where LIDAR sensor 202, field of view 204 and traffic objects 206, 208, 210 are annotated to indicate boundaries 302, 304, 306 associated with field of view 204 and boundaries 308, 310, 312 associated with each traffic object 206, 208, 210. As discussed above, objects can only enter and leave the field of view at boundaries 302, 304, 306, 308, 310, 312. Note that these boundaries 308, 310, 312, 308, 310, 312 are consistent with radial sampling of the field of view 204 by LIDAR sensor 202.

Figure 4:
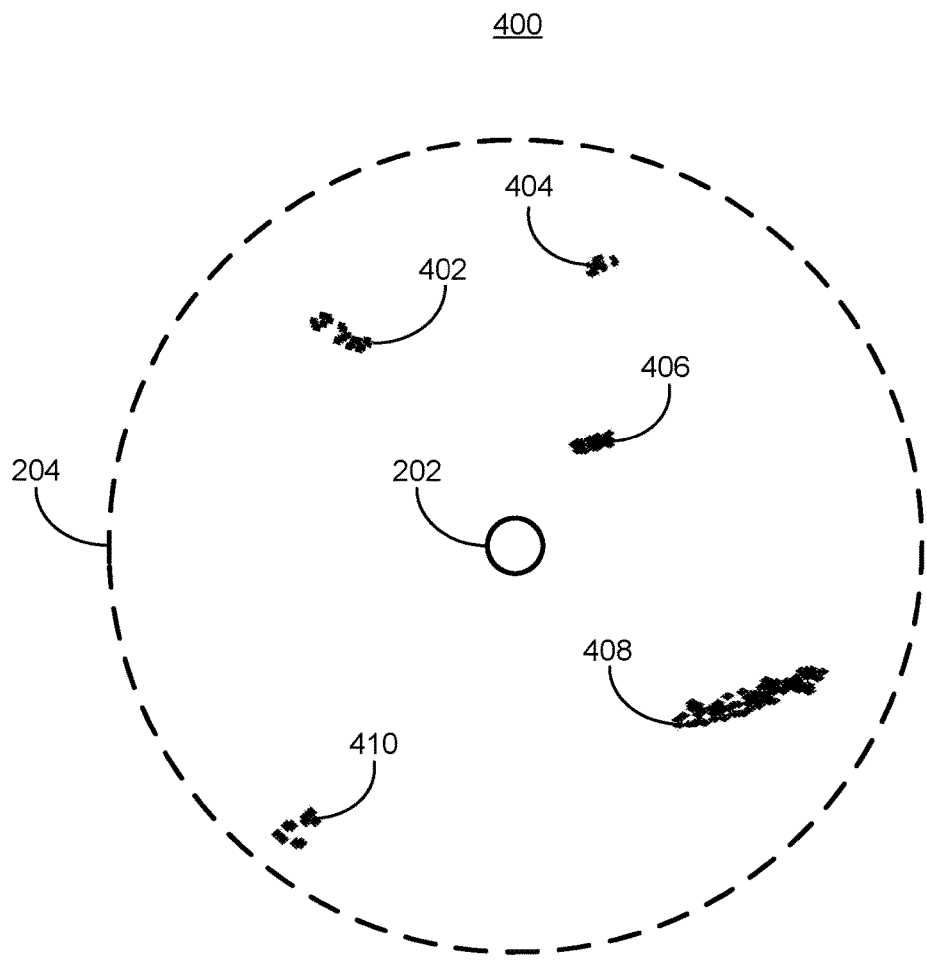
FIG. 4 is a diagram of an example LIDAR sensor and 3D data points.

FIG. 4 is a diagram of a traffic scene 400, where computing device 115 has acquired 3D data points 402, 404, 406 408, 410 within field of view 204 with LIDAR sensor 202. Traffic scene 400 can occur. 3D data points can be acquired by computing device 115 as discussed above in relation to FIG. 2 at a time step successive to the 3D data points acquired in traffic scene 200, for example. 3D data points 402, 404, 406 408, 410 are associated with either a traffic object 206, 208, 210, a boundary 302, 304, 306 associated with a limit, or a boundary 308, 310, 312 associated with an occlusion as described above.

Figure 5:
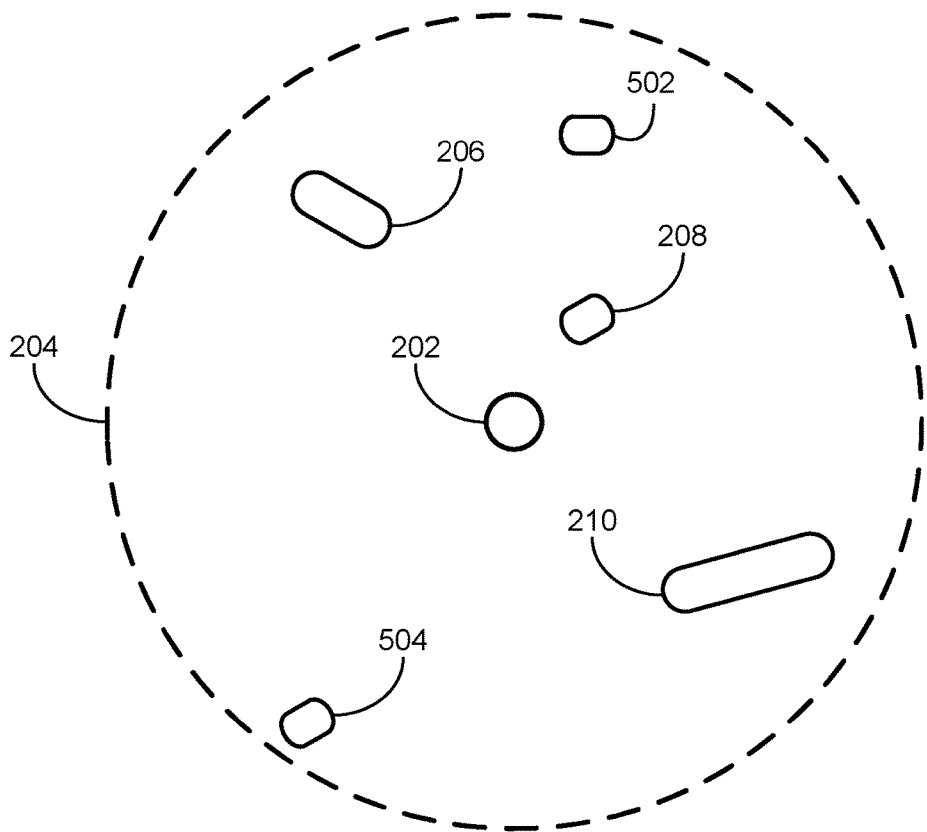
FIG. 5 is a diagram of an example LIDAR sensor and objects.

FIG. 5 is a diagram of traffic scene 400, where computing device 115 has formed a mixture of experts model using 3D data points 402, 404, 406 408, 410 traffic objects 206, 208, 210, boundaries 308, 310, 312, 308, 310, 312 to associate 3D data points 402, 404, 406, 408, 410 with traffic objects 206, 208, 210, 502, 504 using a mixture of experts model based on Bayesian Inference. This model can be solved for traffic objects 206, 208, 210, 502, 504 using Variational Bayesian Inference, which is described in Christopher M. Bishop, "Pattern Recognition and Machine Learning," Springer Science+Business Media, LLC, New York, N.Y., 10013, 2006, § 10.1, pp. 461-474, fully incorporated herein by reference in its entirety. Variational Bayesian Inference is a recursive algorithm that finds model parameters that best fit the 3D data points acquired at the current time step, conditioned on prior knowledge regarding objects predicted at a previous time step and is discussed in relation to FIG. 7, below.

Figure 6:
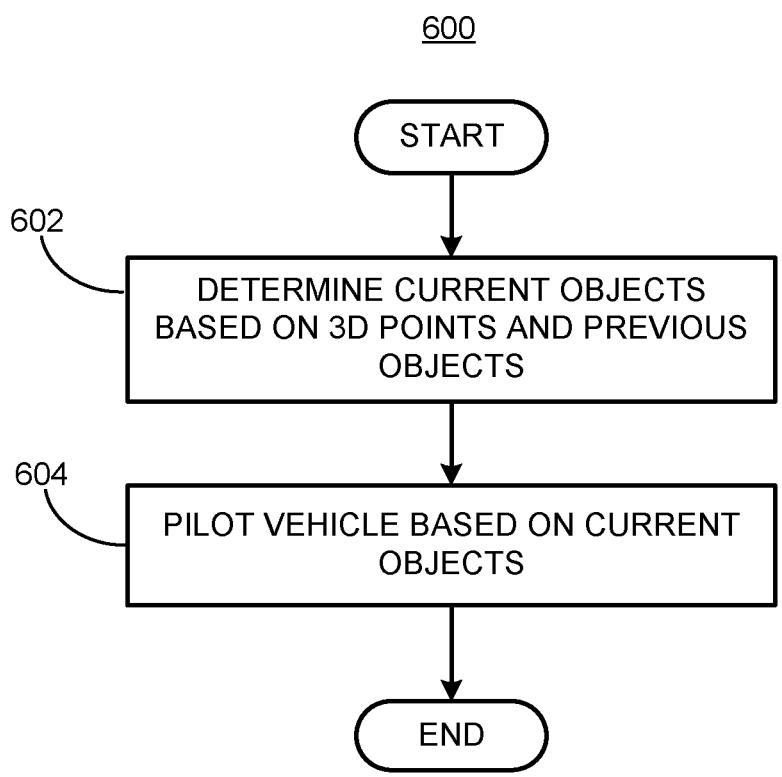
FIG. 6 is a flowchart diagram of an example process to pilot a vehicle.

FIG. 6 is a diagram of a flowchart, described in relation to FIGS. 1-4, of a process 600 for piloting a vehicle 110 based on determined current objects based on 3D points and previous objects, e.g., as described above. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602 where computing device 115 determines current objects based on 3D points and previous objects using techniques described above in relation to FIGS. 2, 3 and 4. Current objects can be traffic objects 206, 208, 210, 502, 504, for example. Step 602 can also be described by process 700 of FIG. 7, wherein previously determined objects, traffic objects 206, 208, 210, for example, and 3D data points 402, 404, 406, 408, 410, for example, are input to computing device 115 as input to process 700.

At step 604 computing device 115 can use the random variable Z, representing traffic objects 206, 208, 210, 502, 504, output by process 700, to pilot vehicle 110. For example, based on the random variable Z, which includes probability distributions of object parameters associated with traffic objects 206, 208, 210, 502, 504, computing device 115 can determine likely locations, sizes and poses of enclosing rectangles associated with traffic objects 206, 208, 210, 502, 504, and directions, speeds and predicted paths for enclosing rectangles associated traffic objects 206, 208, 210, 502, 504 and thereby permit computing device 115 to predict a path for vehicle 110 to travel to reach a predetermined location that avoids traffic objects 206, 208, 210, 502, 504. The process 600 ends following the block 604.

Figure 7:
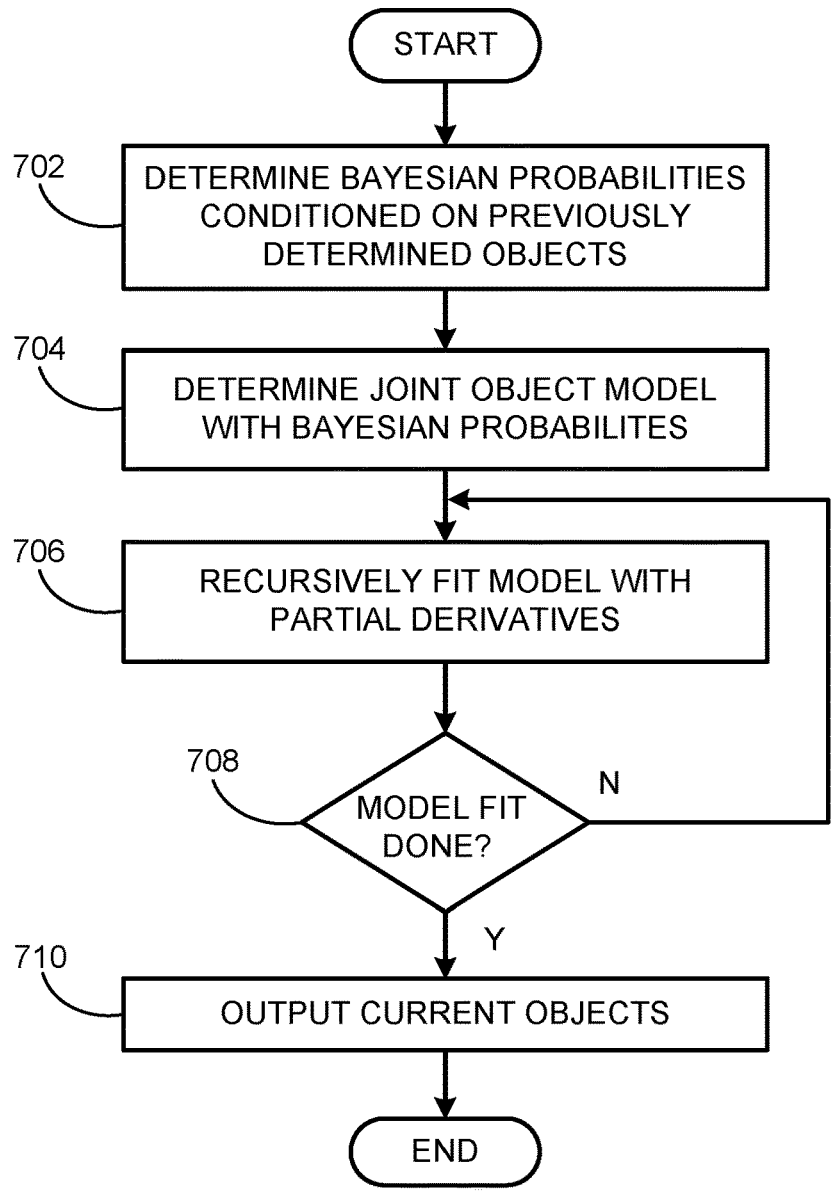
FIG. 7 is a flowchart diagram of an example process to track objects.

FIG. 7 is a diagram of a flowchart, described in relation to FIGS. 1-4, of a process 700 for determining current objects based on 3D points and previously determined objects, e.g., as described above. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders. Process 700 describes step 602 of process 600 as discussed above in relation to FIG. 6.

Process 700 begins at step 702 where computing device 115 determines Bayesian probabilities conditioned on previously determined objects. Expressed as random variables, latent model parameters Z (object parameters) and observed variables X (enclosing rectangles) are sets of N independent, identically distributed variables, wherein Z={$z_1 \ldots z_n$} and X={$x_1 \ldots , x_n$}. Bayesian probabilities can the expressed as the posterior distribution p(Z|X), which is the probability that 3D data points 402, 404, 406, 408, 410 are associated with traffic objects 206, 208, 210, 502, 504, conditioned on model evidence p(X) based on traffic objects 206, 208, 210, and boundaries 308, 310, 312, 308, 310, 312 as discussed above in relation to FIGS. 3, 4 and 5.

At step 704, a mixture of experts model is defined as the joint Bayesian probability distributions p(X, Z) of random variables X and Z, which can be solved for an optimal solution according to the equation:

$$\ln q^*_j(Z_j) = \mathbb{E}_{i \neq j}[\ln p(X,Z)] + \text{const.} \quad (1)$$

where the natural log of $q^*_j(Z_j)$ is an optimal solution to a tractable subset of the joint Bayesian probability distributions p(X, Z) space and is equal to $\mathbb{E}$, the expectation over the random variables X and Z (excepting the cases where i=j) of the natural logs of the joint Bayesian probability distributions p(X, Z) plus a constant. Selection of the tractable subset q(Z) is made to provide a good approximation to the joint distributions p(X, Z) while providing the ability to be solved by Variational Bayesian Inference.

At step 706 computing device 115 solves equation 1 by Variational Bayesian Inference by recursively fitting equation 1 to the tractable subset q(Z) based on partial derivatives to find optimal solutions $q^*_j(Z_j)$ for the joint Bayesian probability distributions p(X, Z). The tractable subset q(Z) can be determined to complete model fitting in a small, finite number of steps. At step 708 computing device 115 can determine that model fitting is done. Model fitting is done when random variable Z changes less than a predetermined amount from the previous step, for example. At step 710 computing device 115 can output random variable Z which includes probability distributions of object parameters associated with, for example, traffic objects 206, 208, 210, 502, 504. The process 700 ends following the block 704.

By expressing the random variable Z as a joint Bayesian probability distributions p(X, Z) both the clustering and data association problems are solved for jointly in a single rigorous probabilistic framework (existing methods solve them independently). Expressing the probability distributions as Bayesian probability distributions enables the use of prior information. Specifically, tracking output from a previous time step provides information about how many objects we expect to observe at the current time step, and where we expect to observe them. The proposed approach advantageously leverages this prior information to seed/initialize the clustering routine in a rigorous Bayesian probabilistic framework.

Similarly, via the same rigorous Bayesian probabilistic framework we can leverage knowledge of where we expect to see new objects; specifically, at the extent of our sensor field of view 204, and adjacent limits 308, 310, 312 and occlusion boundaries 308, 310, 312. This naturally helps distinguish between false alarms and new objects that are being observed for the first time. The data association problem becomes trivial because all new clusters are inherently assigned to the track that was used to seed/initialize the cluster in the Variational Bayesian Inference routine in process 700.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory.

Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method, comprising:
   updating one or more current objects based on applying Bayesian probabilities, conditioned on previously determined objects, to a joint object model that models point cloud data points and a plurality of objects, including each current object, based on individual attributes of each of the plurality of objects; and
   piloting a vehicle based on the one or more current objects.

2. The method of claim 1, wherein the current objects have parameters including locations, sizes, poses, speeds, directions and predicted paths.

3. The method of claim 1, wherein the previously determined objects have parameters including locations, sizes, poses, speeds, directions, predicted paths, and boundaries.

4. The method of claim 1, wherein the point cloud data points are determined by LIDAR.

5. The method of claim 1, wherein the current objects are determined by recursively fitting object model parameters in a joint object model using Bayesian probabilities to model object parameters associated with each of the current objects, wherein each object parameters model is conditioned based on respective previously determined objects.

6. The method of claim 5, wherein the recursive model fitting is performed by determining partial derivatives with respect to each of the model object parameters in the joint object model.

7. The method of claim 6, wherein the joint object model is determined to cause the recursive fit to converge in a predetermined number of steps.

8. The method of claim 7, wherein the joint object model includes an expected number of objects, based on the previously determined objects.

9. The method of claim 8, wherein the joint object model includes one or more new objects.

10. The method of claim 9, wherein the one or more new objects are located at occlusion boundaries associated with previously determined objects or at predetermined limits of LIDAR sensor range.

11. An apparatus, comprising:
    a processor;
    a memory, the memory storing instructions executable by the processor to:
       update one or more current objects based on applying Bayesian probabilities, conditioned on previously determined objects, to a joint object model that models point cloud data points and a plurality of objects, including each current object, based on individual attributes of each of the plurality of objects; and
    pilot a vehicle based on the one or more current objects.

12. The apparatus of claim 11, wherein the current objects have parameters including locations, sizes, poses, speeds, directions and predicted paths.

13. The apparatus of claim 11, wherein the previously determined object states have parameters including locations, sizes, poses, speeds, directions, predicted paths, and boundaries.

14. The apparatus of claim 11, wherein the point cloud data points are determined by LIDAR.

15. The apparatus of claim 11, wherein the current objects are determined by recursively fitting object model parameters in a joint object model using Bayesian probabilities associated with each of the object model parameters, each respectively conditioned with object model parameters based on the respective previously determined objects.

16. The apparatus of claim 15, wherein the recursive model fitting is performed by determining partial derivatives with respect to each of the object model parameters in the joint object model.

17. The apparatus of claim 16, wherein the joint object model is arranged to cause the recursive fit to converge in a predetermined number of steps.

18. The apparatus of claim 17, wherein the joint object model includes an expected number of objects, based on the previously determined objects.

19. The apparatus of claim 18, wherein the joint object model includes one or more new objects.

20. The apparatus of claim 19, wherein the new object is located at an occlusion boundary associated with a previously determined object or at predetermined limits of LIDAR sensor range.

* * * * *